United States Patent [19]

Gray et al.

[11] Patent Number: 4,722,541

[45] Date of Patent: Feb. 2, 1988

[54] SPLASH AND SPRAY SUPPRESSOR FOR VEHICLES

[75] Inventors: David B. Gray, Greenville, S.C.; Frederick L. Stoller, San Juan, P.R.

[73] Assignee: Phillips Petroleum Company, Bartlesville, Okla.

[21] Appl. No.: 516,229

[22] Filed: Jul. 22, 1983

[51] Int. Cl.$^4$ .............................................. B62D 25/16
[52] U.S. Cl. ................. 280/154.5 R; 428/31
[58] Field of Search ........ 280/152 R, 153 R, 154.5 R, 280/154.5 A, 159; 428/31

[56] References Cited

U.S. PATENT DOCUMENTS

| | | | |
|---|---|---|---|
| 1,904,342 | 4/1933 | Zaiger et al. | 280/154.5 |
| 2,038,234 | 4/1936 | Olen | 280/152 R |
| 2,054,361 | 9/1936 | Cohen | 280/152 R |
| 3,341,222 | 9/1967 | Roberts | 280/154.5 |
| 3,899,192 | 8/1975 | Reddaway | 280/154.5 |
| 4,012,053 | 5/1977 | Bode | 280/154.5 R |
| 4,035,543 | 7/1977 | Draper et al. | 428/245 |
| 4,089,537 | 5/1978 | Pralutsky | 280/154.5 R |
| 4,205,861 | 6/1980 | Roberts | 280/154.5 |
| 4,258,929 | 3/1981 | Brandon et al. | 280/154.5 |
| 4,302,495 | 11/1981 | Marra | 428/110 |
| 4,361,606 | 11/1982 | Butler et al. | 280/154.5 R |
| 4,382,606 | 5/1983 | Lightle et al. | 280/154.5 R |

FOREIGN PATENT DOCUMENTS

WO82/03829 11/1982 PCT Int'l Appl. .

*Primary Examiner*—Richard A. Bertsch
*Attorney, Agent, or Firm*—J. E. Phillips

[57] ABSTRACT

Spray reduction means for moving vehicles are provided comprising at least one layer of non-woven fabric bonded to the surface of a backing containing channel means for draining water from the spray reduction means, said backing being capable of supporting the non-woven fabric. The spray reduction means is in the form of a laminate.

20 Claims, 5 Drawing Figures

SPLASH AND SPRAY SUPPRESSOR FOR VEHICLES

The invention relates to a device suitable for reducing splash and spray (mist) generated by moving vehicles.

The problem of splash and spray from vehicles operating on wet roads is well known and the resultant decrease in visibility for road users in their proximity is a major hazard. The splash and spray is caused by the wheels, and specifically the tires, picking up fluid from the underlying roadway and projecting droplets of fluid by the centrifugal force imparted by the revolving wheels. The droplets of fluid impinge at high speed upon the mudguards, flaps or other parts of the vehicle, which causes them to be broken down or atomized into fine droplets, light enough to be carried by the wind or slipstream of the vehicle. The roadway fluids are generally rain, slush, powdered snow, mud, road oil or mixtures thereof.

Various devices have been tried in an attempt to reduce the splash and spray from vehicles. One type of device comprises enclosing the wheel with mud flaps which hang behind the wheels, and skirts which hang alongside the tires in an attempt to confine the splash and spray. Such devices are generally unsatisfactory since they provide large solid surfaces against which fluid may impinge at high speed and atomize, and they tend to cause turbulent airflow surrounding the vehicle by which such atomized droplets may be carried. If such skirts extend downwardly over the sides of the wheels to a large extent, they also cause difficulty in installing and removing the wheels.

A second type of device entraps and removes water droplets rather than confining them in the wheel well. U.S. Pat. No. 3,341,222 discloses a mudguard with grooves perforated at their apex so that water thrown from the tires passes through the perforations carried by gravity to a location away from the wheels and is thus not available to cause spray. While this system is an improvement over a conventional mudguard, its efficiency leaves much to be desired. U.S. Pat. No. 3,899,192 discloses a system of lining wheel arches and flaps with a material comprising a backing section and a plurality of elongate elements secured at one end to the backing section with their other ends projecting outwardly, generally in the direction of the wheel, to form a random tangled mass facing the wheel. Here, however, the accumulated water is retained in the bristles and can re-enter the wheel area by subsequent splashing of new water droplets.

Accordingly, it is an object of this invention to provide an improved device for reducing the splash and spray generated from moving vehicles.

Other aspects, objects, and advantages of the present invention are apparent from the specification and appended claims.

In accordance with the present invention there is provided a particularly effective splash and spray reduction means which may be readily secured to a vehicle, preferably in the region of the wheels. This spray reduction means is in the form of a laminate which comprises at least one layer of non-woven fabric bonded to the surface of a backing which contains at least one channel means for removing water from the spray reduction means, the backing being capable of supporting the non-woven fabric.

Typically, the channeling means are grooves which are used to coalesce the water droplets and remove them from the spray reduction means.

To provide adequate strength to the laminate, the non-woven fabric must be a cohesive batt of continuous filaments or staple fibers. These fabrics are produced by spun binding or random laying down of the fibers followed by needle punching and fusing. Needle punching on one side and heat fusing of the batt on at least one side can be provided.

Generally the fabric employed will weigh between about 140 to 1400 g/m$^2$ (5 oz/sq yd to 50 oz/sq yd), preferably about 500–850 g/m$^2$ (18 oz/sq yd to 30 oz/sq yd). The preferred non-woven fabric employed in the present invention is made from polyester, polyolefin, polyamide (nylon) or polyacrylic fibers. Polypropylene fibers from 10 to 100 denier per fiber are most preferred.

In a more presently preferred embodiment, the non-woven fabric contains channel means for removing water droplets as does the backing.

Generally the backing for the non-woven fabric is from about 100–600 mils, preferably about 130–180 mils thick. The backing is any material capable of supporting the non-woven fabric. A plastic, metal or rubber support made from conventional processes such as extrusion, forging, etc. would be appropriate. A plastic backing made of high density polyethylene (i.e. about 0.94 to 0.96 g/cc) has been found to be especially useful.

The laminates are made by pressing, fusion, the use of adhesives or otherwise attaching in some appropriate manner the non-woven fabric onto the support or backing. The pressing can be accomplished by a pair of nip rollers or press platens which have heating and pressure means. The heat and pressure are applied to the sheet side of the supermposed sections.

DETAILED DESCRIPTION

Figure 1:
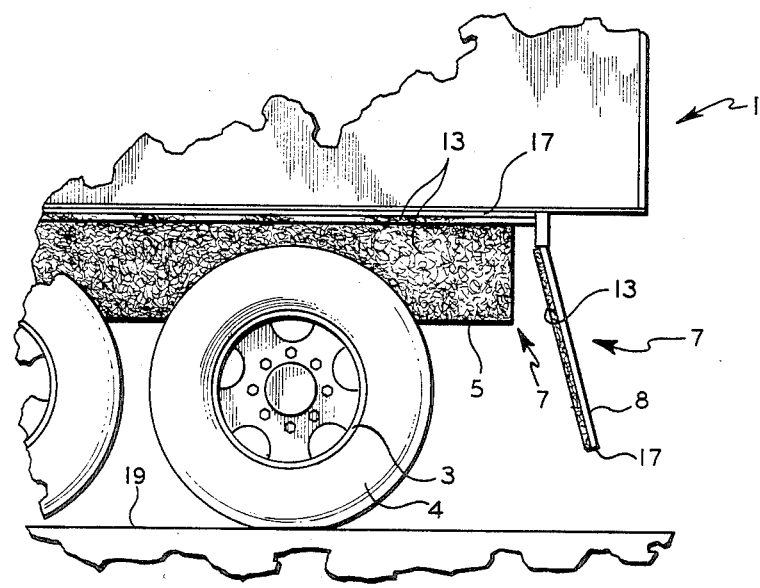
FIG. 1 is a partial view of the wheel area of a vehicle showing the placement of the spray reduction means.

With reference to FIG. 1, a wheeled vehicle 1 is shown incorporating a spray reduction means 7. The vehicle can be an automobile, truck, trailer, or other vehicle which has a wheel 3 with tire 4 or other parts capable of producing splash and spray. The wheeled vehicle can be a truck such as semi trailer-tractor rig which has a mud guard or a mud flap 8 and inner wheel area 5.

The spray reduction means 7 takes the form of a non-woven fabric 13 attached to a mudguard 8. The spray reduction means 7 may also take the form of a non-woven fabric attached to the curtains or valances which are generally positioned at the sides of the wheels. Such curtains or valances include a solid backing, e.g. metal, preferably aluminum, rubber, or plastic, and are arranged so that the skeletal structure of the non-woven fabric 7 faces the wheel. Preferably the valances overhang the top of the tires by at least one inch (2.5 cm). The valances or curtains may also be hung from the sides of vehicles between sets of wheels to absorb spray. The valance may conveniently be secured to the body of the vehicle by bolts or clips. The valances may also be provided with gutters or deflectors to provide for water drainage away from the wheel area.

The spray reduction means 7 is comprised of a laminate 15 having a layer of non-woven fabric 13 secured to a backing 17. The spray reduction means 7 itself is bonded to a backing 17, preferably plastic in order to facilitate securing the laminate to the vehicle by screws or bolts. In addition the underside of the vehicle and inner wheel area 5 of the trailer can be lined with the laminate of the present invention.

The spray reduction means 7 also take the form of a mudflap 8 which is positioned rearwardly and may be positioned forwardly of the wheels 3 or between dual wheels 3 and tires 4 and preferably extends at least the width of the wheel 3 and depends close to the road surface 19. On some vehicles, the mud flap 8 positioned at the rear of the vehicle extends the full width thereof. The mud flap 8 may be secured to an open frame assembly, e.g. a U-shaped retainng frame or other conventional attachment means. The spray reduction means 7 can be attached to any area on the vehicle which is capable of generating splash and spray such as the leading edge or underside of the trailer on a semi trailer-tractor rig. The lining is secured by any suitable fixing means, e.g. adhesives, clips, bolts, screws, wires, etc.

Figure 2:
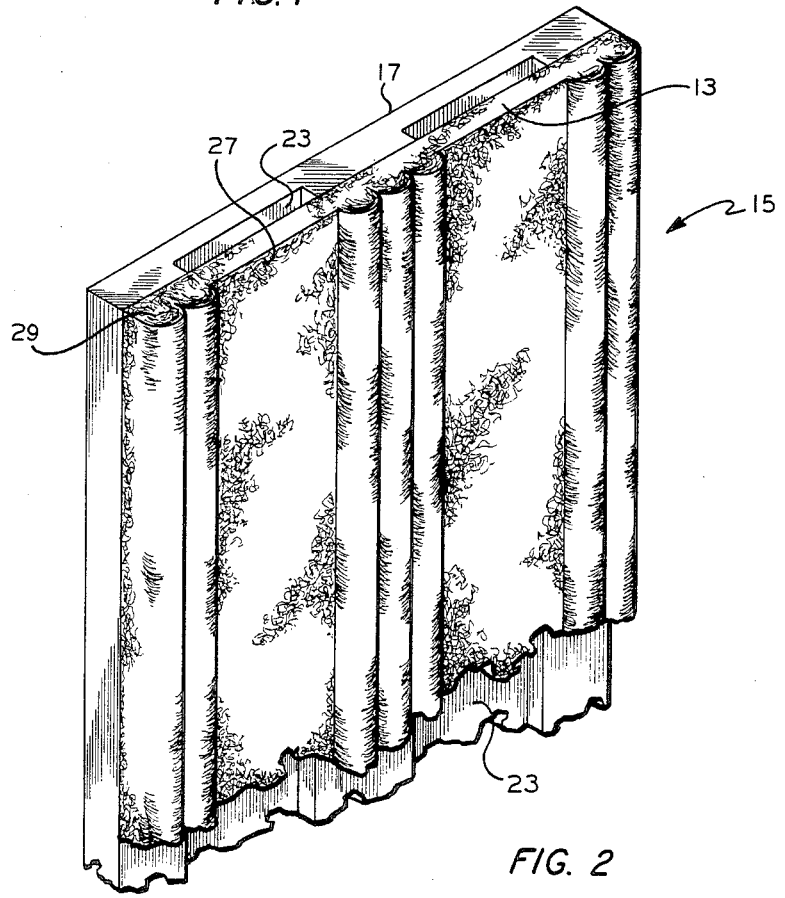
FIG. 2 is an fragmental isometric view of the spray reduction means partially cut away to show the underlying construction of the material.
Figure 5:
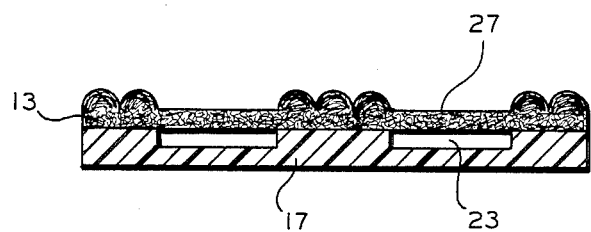
FIG. 5 is a cross-sectional view of the invention shown in FIG. 2.

Reference is now made to FIG. 2 wherein a backing 17 provides support for the laminate 15. When used as a mudflap 8, the backing 17 is to be thick enough to provide rigidity against wind and flying objects. Also the backing 17 is made of a material which is wear resistant to objects striking it such as rocks. When applied to the frame or under surface of the vehicle 2 the backing 17 is of a lesser thickness material due to the non-rigidity requirement. The backing 17 contains channels 23 for draining the water off the surface of the spray reduction means 7 as illustrated in FIGS. 5, 6, and 7. The channels 23 can be machined into the backing, extruded with the backing, or other conventional methods can be used to groove a plastic, metal, or rubber backing. The channels 23 extend along the entire length of the laminate 15 and preferably are oriented vertical in reference to the earth or roadway 19. It is understood however that on the underside of the vehicle they cannot be oriented vertical. At these locations, the preferred orientation of the channels 23 are parallel with the direction of vehicle movement. The preferred spray reduction 7 means has a solid backing 17, the structure having a sufficiently high tensile strength so as to be substantially self-supporting.

The base (the lower most edge of the laminate when secured to the vehicle) of the mudflap may be conveniently provided with a gutter or deflector (not shown) extending across the width of the flap such that water draining through the skeletal structure is collected and/or deflected to one side of the path of any following wheels of the vehicle 1.

Figure 4:
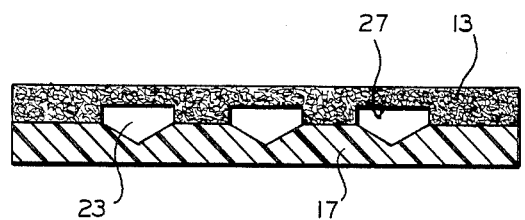
FIG. 4 is a cross-sectional view of the spray reduction means showing a non-woven fabric containing a channeling means and a backing containing channeling means.

A non-woven fabric 13 comprising a second layer of the laminate is attached to the backing sheet 17. The non-woven fabric 13 dampens the impact of the liquid and provides removal means for the projected liquid droplets. The non-woven fabric 13 having a porous structure causes the fast moving liquid droplets to strike the surface of the fabric 13 to either spread across its outer surface or enter the fabric itself. In either situation, the droplet is retained on the fabric 13 and is prevented from atomizing into a spray or mist. The flexibility of the non-woven fabric 13 adds to the dampening effect. In addition, the non-woven fabric 13 exhibits a "wicking" characteristic which causes liquid at one side of the material to flow through the fabric 13 to the other side. This wicking action is very advantageous to the operation of the laminate. As an extra benefit, the non-woven fabric 13 also dampens and protects the backing sheet 17 from projectiles such as rocks while the fabric 13 itself remains functional. The non-woven fabric 13 can also have channels 27 between the ribs 29 as seen in FIGS. 4 and 5. The channels 27 are accomplished by any of several methods which include trimming central areas of the fabric, laying down fibers in a row pattern area, embossing, or selective needle punching. As in the backing 17, the channels 27 extend the entire length of the material and preferably are oriented parallel with the grooves 23 in the backing 17.

Figure 3:
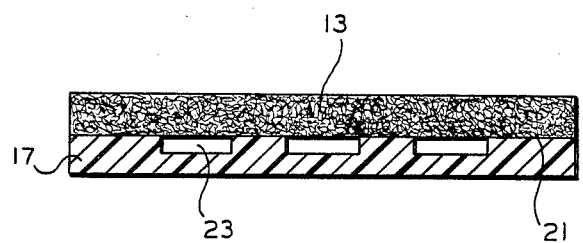
FIG. 3 is a cross-sectional view of the spray reduction means showing non-woven fabric and backing containing channeling means.

FIGS. 3 through 5 show various embodiments of the invention.

FIG. 3 is a non-channeled, non-woven fabric 13 secured to a channeled backing sheet 17 having channels 23 at the interface surface 21. This embodiment provides for a protected run off channel.

FIG. 4 is a double channeled laminate comprising a channeled non-woven fabric 13 having channels 27 secured to channeled backing backing 17 having channels 23. This embodiment provides both protected and enlarged run off channels.

FIG. 5 is a double channeled laminate comprising a channeled non-woven fabric 13 having channels 27 secured to channeled backing backing 17 which contains channels 23. This construction provides for double run off channels such as for use in heavy flow conditions.

Reasonable modifications and variations are possible from the foregoing without departing from the spirit or scope of the present invention.

We claim:

1. A spray reduction means comprises a laminate of at least one layer of non-woven fabric bonded to the surface of a backing containing channel means for draining water from the laminate, said backing being capable of supporting the non-woven fabric and wherein said non-woven fabric contains channel means for removing water from said laminate.

2. A laminate according to claim 1 wherein said non-woven fabric's fibers have a weight between about 140 to 1400 g/m$^2$.

3. A laminate according to claim 1 wherein said non-woven fabric is made from fibers selected from the group consisting of polyester, polyolefin, polyamide, or polyacrylic fibers.

4. A laminate according to claim 3 wherein said fibers are polypropylene.

5. A laminate according to claim 1 wherein said backing has a thickness of from about 100 to 600 mils.

6. A laminate according to claim 1 wherein said backing is one selected from the group consisting of a plastic, rubber, or metal.

7. A laminate according to claim 6 wherein said backing is a plastic consisting of high density polyethylene having a density of from about 0.94 to 0.96 g/cc.

8. A laminate according to claim 1 wherein at least one non-woven fabric is heat bonded to the surface of a high density polyethylene backing containing channel means for draining water from the laminate, said high density polyethylene having a density of from about 0.94 to 0.96 g/cc.

9. A laminate according to claim 8 wherein said non-woven fabric of polypropylene fibers contains channel means for draining water from the laminate.

10. A spray reduction means according to claim 1 wherein the channel means in said nonwoven fabric are on an outer surface of said laminate.

11. A spray reduction means according to claim 1 wheren the channel means in said nonwoven fabric are positioned inwardly in the laminate so as to face said backing and which cooperate with the channel means in said backing.

12. A spray reduction means for reducing splash and spray of fluid thrown from the wheels of a vehicle comprising a laminate containing at least one non-woven fabric bonded to the surface of a backing containing channels means for removing water from the laminate, said backing being capable of supporting said non-woven fabric and wherein said non-woven fabric contains channel means for draining water from said spray-reduction means.

13. A spray reduction means according to claim 12 wherein said non-woven fabric fibers have a weight between about 140 to 1400 g/m$^2$.

14. A spray reduction means according to claim 12 wherein said non-woven fabric is made from fibers selected from the group consisting of polyester, polyolefin, polyamide, or polyacrylic fibers.

15. A spray reduction means according to claim 14 wherein said fibers are polypropylene.

16. A spray reduction means according to claim 15 wherein said non-woven fabric of polypropylene fibers is heat bonded to a high density polyethylene backing containing channel means for draining water from the laminate, said high density polyethylene having a density of from about 0.94 to 0.96 g/cc.

17. A spray reduction means according to claim 16 wherein said non-woven fabric contains channel means for draining water from the laminate.

18. A spray reduction means according to claim 12 wherein said backing containing a channel means has a thickness of from about 100 to 600 mils.

19. A spray reduction means according to claim 12 wherein said backing containing a channel means is one selected from the group consisting of a plastic, rubber, or metal backing.

20. A spray reduction means according to claim 19 wherein said backing is a plastic backing consisting of high density polyethylene having a density of from about 0.94 to 0.96 g/cc.

* * * * *